(12) United States Patent
Hatamiya et al.

(10) Patent No.: US 7,096,659 B1
(45) Date of Patent: Aug. 29, 2006

(54) GAS TURBINE ELECTRIC POWER GENERATION EQUIPMENT AND AIR HUMIDIFIER

(75) Inventors: Shigeo Hatamiya, Hitachi (JP); Masahiko Yamagishi, Hitachi (JP); Osamu Yokomizo, Tokai (JP)

(73) Assignee: Hitachi, Ltd., Tokyo (JP)

( * ) Notice: Subject to any disclaimer, the term of this patent is extended or adjusted under 35 U.S.C. 154(b) by 143 days.

(21) Appl. No.: 11/058,366

(22) Filed: Feb. 16, 2005

Related U.S. Application Data

(62) Division of application No. 10/673,164, filed on Sep. 30, 2003, now Pat. No. 6,901,736, which is a division of application No. 09/463,231, filed on Jan. 21, 2000, now Pat. No. 6,644,013.

(51) Int. Cl.
*F02C 3/30* (2006.01)

(52) U.S. Cl. ........................... 60/39.5; 60/39.53

(58) Field of Classification Search ............... 60/39.5, 60/39.511, 39.52, 39.53, 39.55, 39.59, 775
See application file for complete search history.

(56) References Cited

U.S. PATENT DOCUMENTS

| | | | |
|---|---|---|---|
| 2,186,706 A | | 1/1940 | Martinka |
| 2,678,532 A | * | 5/1954 | Miller ................ 60/39.53 |
| 3,657,879 A | * | 4/1972 | Ewbank et al. ............ 60/775 |
| 4,829,763 A | * | 5/1989 | Rao ..................... 60/39.53 |
| 5,054,279 A | | 10/1991 | Hines |
| 5,507,141 A | | 4/1996 | Stigsson |
| 6,263,661 B1 | | 7/2001 | van der Burgt et al. |
| 6,378,284 B1 | | 4/2002 | Utamura |

FOREIGN PATENT DOCUMENTS

| | | |
|---|---|---|
| CH | 457039 | 5/1967 |
| EP | 444913 | 9/1991 |
| FR | 1007140 | 5/1952 |
| JP | 55-96326 | 7/1980 |
| JP | 64-31012 | 2/1989 |
| JP | 1-195053 | 8/1989 |
| JP | 8-61014 | 3/1996 |
| JP | 9-264158 | 10/1997 |
| JP | 10-30811 | 2/1998 |
| JP | 10-103078 | 4/1998 |
| JP | 10-103079 | 4/1998 |
| JP | 10-110628 | 4/1998 |

OTHER PUBLICATIONS

W.H. Day et al, "FT4000 Hat With Natural Gas Fuel", pp. 239-245 of IGTI-vol. 7, Asme Cogen-Turbo, 1992.

* cited by examiner

*Primary Examiner*—Louis J. Casaregola
(74) *Attorney, Agent, or Firm*—Mattingly, Stanger, Malur & Brundidge, P.C.

(57) ABSTRACT

The present invention relates to an air humidifier for adding moisture to a working medium of a gas turbine for humidification, and gas turbine electric power generation equipment for driving the gas turbine by the working medium of high moisture to general electricity. An object of the present invention is to reduce pressure loss of burned exhaust gas of the gas turbine to improve output or efficiency of electric power generation. There comprises a humidifier (3), a combustor (5), a turbine (6), a generator (7), and a water recovery unit (10), further comprises an exhaust gas reheater (11) for heating burned exhaust gas discharged from the water recovery unit by surplus water discharged from the humidifier.

5 Claims, 6 Drawing Sheets

GAS TURBINE ELECTRIC POWER GENERATION EQUIPMENT AND AIR HUMIDIFIER

This is a divisional application of U.S. Ser. No. 10/673,164, filed Sep. 30, 2003, now U.S. Pat. No. 6,901,736 which is a divisional of U.S. Ser. No. 09/463,231, filed Jan. 21, 2000, now U.S. Pat. No. 6,644,013. This application is related to U.S. Ser. No. 10/301,609, filed Nov. 22, 2002, now U.S. Pat. No. 6,578,354.

TECHNICAL FIELD

The present invention relates to an air humidifier for adding moisture to a working medium of a gas turbine for humidification, and gas turbine electric power generation equipment in which a gas turbine is driven by the working medium of high moisture, and moisture is recovered from gas turbine exhaust gases for recycle or recirculation, and particularly to an air humidifier and gas turbine electric power generation equipment which reduce pressure loss of the working medium or pressure loss of the gas turbine exhaust gas.

BACKGROUND ART

As a prior art relating to HAT (Humid Air Turbin) cycle, in U.S. Pat. No. 5,507,141, Japanese Patent Publication No. Hei 1-31012, Japanese Patent Publication No. Hei 1-195053, Japanese Patent Laid-open No. Hei 9-264158, and Japanese Patent Laid-open No. Hei 10-103079 is described a gas turbine cycle for carrying out heat recovery of exhaust of a turbine or heat recovery of exhaust of a turbine and intermediate cooling of a compressor by a liquid phase mixture of compressed air/water/steam obtained by pouring liquid phase water into a part or the whole of compressed air obtained by compressing by the compressor air used as self-sustained combustion gas, working medium gas or the like of gas mainly comprising air.

It has been contemplated that the above gas turbine cycle can achieve the output and high efficiency equal to of more than those of the combined cycle merely by a gas turbine without requiring a steam turbine, but a problem of consuming a large the quantity of water has been also pointed out.

So, in "FT4000 HAT WITH NATURAL GAS FUEL" on pages 239 to 245 of "IGTI-Vol. 7, ASME COGEN-TURBO 1992", Japanese Patent Laid-open No. Hei 10-30811, and Japanese Patent Laid-open No. Hei 10-110628, a system for recovering moisture from exhaust gases of the gas turbine for recycle or recirculation is contemplated. The exhaust gas from which moisture is recovered is at a temperature of, for example, approximately 40° C. which is lower than a condensation temperature (100° C.), but since the exhaust gas cannot be released into atmosphere at that temperature in terms of environment, exhaust gas from which moisture has been recovered is heat exchanged with exhaust gas prior to recovery of moisture to reheat it.

In the above-described prior arts, the exhaust gas prior to recovery of moisture is used as a reheating medium for the exhaust gas from which moisture has been recovered to carry out heat exchanging between gas and gas. As a result, heat exchanging equipment becomes large-scaled and pressure loss of exhaust gas increases. Since pressure of exhaust gas at an inlet of a chimney is determined in a relation with atmospheric pressure, when pressure loss of exhaust gas before reaching the chimney increases, pressure of exhaust gas at an outlet of the gas turbine need be made high. That is, a pressure difference in a working medium between the inlet and outlet of the gas turbine is so small that output of the gas turbine is small. However, such a point as just mentioned has not been studied in the above-described prior arts.

Further, in the above-described prior arts, a humidifying tower has been used to humidify compressed air supplied to the gas turbine. The detailed construction of the humidifying tower is described in, for example, U.S. Pat. No. 2,186,706, or the like.

In the above conventional humidifying tower, compressed air and water are brought into contact in an opposite flow and directly. That is, in the humidifying tower, waterdrops sprayed or dropped are brought into direct contact through a porous medium (which promotes contact between compressed air and water) with compressed air flowing in an upper direction, and moisture is added to the compressed air.

Therefore, since the conventional humidifying tower is operated in the opposite flow and through the porous medium, pressure loss of compressed air is extremely large. When the pressure loss of compressed air is large, pressure of the working medium of the gas turbine is small, and the output of the gas turbine is small. However, nothing on such a point as described has been studied in the above-described prior arts.

It is a first object of the present invention to provide gas turbine electric power generation equipment which reduces pressure loss of burned exhaust gas of a gas turbine to improve output or efficiency of electric power generation.

It is a second object of the present invention to provide gas turbine electric power generation equipment which reduces pressure loss of a working medium of a gas turbine to improve output or efficiency of electric power generation.

It is a third object of the present invention to provide an air humidifier which, while reducing pressure loss of a working medium of a gas turbine, adds moisture to the working medium for humidification.

DISCLOSURE OF INVENTION

For achieving the aforementioned first object, according to the present invention, there is provided gas turbine electric power generation equipment comprising: a humidifier for increasing at least one of a quantity of steam, relative humidity, and absolute humidity of air; a combustor for generating combustion gas by humidified air obtained by the humidifier and fuel; a turbine driven by the combustion gas generated by the combustor; an electricity generator driven by the turbine to generate electricity; a water recovery unit for cooling the burned exhaust gas discharged from the turbine to recover moisture in the burned exhaust gas; and an exhaust gas reheater for heating the burned exhaust gas discharged from the water recovery unit by surplus water left in that used for increasing the quantity of steam or relative humidity or absolute humidity of air by the humidifier.

The aforementioned gas turbine electric power generation equipment according to the present invention takes effect of reducing pressure loss of the burned exhaust gas of the gas turbine to improve output or efficiency of electric power generation.

Further, for achieving the aforementioned first object, according to the present invention, there is provided gas turbine electric power generation equipment comprising: a humidifier for increasing at least one of a quantity of steam, relative humidity, and absolute humidity of air; a combustor for generating combustion gas by humidified air obtained by the humidifier and fuel; a turbine driven by the combustion gas generated by the combustor; an electricity generator driven by the turbine to generate electricity; a water recovery unit for condensing moisture in the burned exhaust gas discharged from the turbine; and a heat exchanger for heat-exchanging between surplus left in that used for increasing the quantity of steam or relative humidity or absolute humidity of air by the humidifier and the burned exhaust gas discharged from the water recovery unit.

The aforementioned gas turbine electric power generation equipment according to the present invention takes effect of reducing pressure loss of the burned exhaust gas of the gas turbine to improve output or efficiency of electric power generation.

Further, for achieving the aforementioned first object, according to the present invention, there is provided gas turbine electric power generation equipment comprising: a compressor for compressing air; a humidifier for adding moisture to the compressed air obtained by the compressor; a combustor for generating combustion gas by humidified air obtained by the humidifier and fuel; a turbine driven by the combustion gas generated by the combustor; an electricity generator driven by the turbine to generate electricity; a regenerator for heating the humidified air supplied to the combustor by the burned exhaust gas discharged from the turbine; a water heater for heating water supplied to the humidifier by the burned exhaust gas discharged from the regenerator; a water recovery unit for cooling the burned exhaust gas discharged from the water heater to recover moisture in the burned exhaust gas; and an exhaust gas reheater for heating the burned exhaust gas discharged from the water recovery unit by surplus water discharged from the humidifier. Further, the water heater heats the surplus water discharged from the exhaust gas reheater to supply it to the humidifier. Preferably, the surplus water discharged from the exhaust gas reheater is supplied to an inlet of the compressor. Further, preferably, a part of water supplied to the humidifier is used to cool the turbine.

The aforementioned gas turbine electric power generation equipment according to the present invention takes effect of reducing pressure loss of the burned exhaust gas of the gas turbine to improve output or efficiency of electric power generation.

Further, for achieving the aforementioned first object, according to the present invention, there is provided gas turbine electric power generation equipment comprising: a humidifier for increasing at least one of a quantity of steam, relative humidity, and absolute humidity of air; a combustor for generating combustion gas by humidified air obtained by the humidifier and fuel; a turbine driven by the combustion gas generated by the combustor; an electricity generator driven by the turbine to generate electricity; a water heater for heating water supplied to the humidifier by heat of the burned exhaust gas discharged from the turbine; a water recovery unit for cooling the burned exhaust gas discharged from the water heater to recover moisture in the burned exhaust gas; and an exhaust gas reheater for heating the burned exhaust gas discharged from the water recovery unit by a part of water obtained by being heated by the water heater.

The aforementioned gas turbine electric power generation equipment according to the present invention takes effect of reducing pressure loss of the burned exhaust gas of the gas turbine to improve output or efficiency of electric power generation.

Further, for achieving the aforementioned first object, according to the present invention, there is provided gas turbine electric power generation equipment comprising: a humidifier for increasing at least one of a quantity of steam, relative humidity, and absolute humidity of air; a combustor for generating combustion gas by humidified air obtained by the humidifier and fuel; a turbine driven by the combustion gas generated by the combustor; an electricity generator driven by the turbine to generate electricity; a first heat exchanger for heat-exchanging between the burned exhaust gas discharged from the turbine and water supplied to the humidifier; a water recovery unit for condensing moisture in the burned exhaust gas discharged from the first heat exchanger; and a second heat exchanger for heat-exchanging between a part of water obtained by the first heat exchanger and the burned exhaust gas discharged from the water recovery unit.

The aforementioned gas turbine electric power generation equipment according to the present invention takes effect of reducing pressure loss of the burned exhaust gas of the gas turbine to improve output or efficiency of electric power generation.

Further, for achieving the aforementioned first object, according to the present invention, there is provided gas turbine electric power generation equipment comprising: a compressor for compressing air; a humidifier for adding moisture to the compressed air obtained by the compressor; a combustor for generating combustion gas by humidified air obtained by the humidifier and fuel; a turbine driven by the combustion gas generated by the combustor; an electricity generator driven by the turbine to generate electricity; a regenerator for heating the humidified air supplied to the combustor by the burned exhaust gas discharged from the turbine; a water heater for heating water supplied to the humidifier by the burned exhaust gas discharged from the regenerator; a water recovery unit for cooling the burned exhaust gas discharged from the water heater to recover moisture in the burned exhaust gas; and an exhaust gas reheater for heating the burned exhaust gas discharged from the water recovery unit by a part of water obtained by being heated by the water heater. Moreover, the water heater heats waste water discharged from the exhaust gas reheater to supply it to the humidifier. Preferably, the waste water discharged from the exhaust gas reheater is supplied to an inlet of the compressor. Further, preferably, a part of water supplied to the humidifier is used to cool the turbine.

The aforementioned gas turbine electric power generation equipment according to the present invention takes effect of reducing pressure loss of the burned exhaust gas of the gas turbine to improve output or efficiency of electric power generation.

Further, for achieving the aforementioned second object, according to the present invention, there is provided gas turbine electric power generation equipment comprising: a humidifier for increasing at least one of a quantity of steam, relative humidity, and absolute humidity of air; a combustor for generating combustion gas by humidified air obtained by the humidifier and fuel; a turbine driven by the combustion gas generated by the combustor; and an electricity generator driven by the turbine to generate electricity. Moreover, the humidifier causes steam having pressure as high as the air to merge with the air to increase at least one of a quantity of steam, relative humidity, and absolute humidity of the air. Preferably, the steam is saturated steam.

The aforementioned gas turbine electric power generation equipment according to the present invention takes effect of reducing pressure loss of the working medium (particularly, air for burning) of the gas turbine to improve output or efficiency of electric power generation.

Further, for achieving the aforementioned second object, according to the present invention, there is provided gas turbine electric power generation equipment comprising: a humidifier for increasing at least one of a quantity of steam, relative humidity, and absolute humidity of air; a combustor for generating combustion gas by humidified air obtained by the humidifier and fuel; a turbine driven by the combustion gas generated by the combustor; and an electricity generator driven by the turbine to generate electricity. Moreover, the humidifier comprises an expanding portion for expanding compressed water higher in pressure than the air to pressure as high as the air, and a mixing portion for mixing steam obtained in the expanding portion with the air.

The aforementioned gas turbine electric power generation equipment according to the present invention takes effect of reducing pressure loss of the working medium (particularly, air for burning) of the gas turbine to improve output or efficiency of electric power generation.

Further, for achieving the aforementioned second object, according to the present invention, there is provided gas turbine electric power generation equipment comprising: a humidifier for increasing at least one of a quantity of steam, relative humidity, and absolute humidity of air; a combustor for generating combustion gas by humidified air obtained by the humidifier and fuel; a turbine driven by the combustion gas generated by the combustor; and an electricity generator driven by the turbine to generate electricity. Moreover, the humidifier comprises a flow path through which the air flows, and a vaporizing portion communicated with the flow path to jet and vaporize compressed water higher in pressure than the air.

The aforementioned gas turbine electric power generation equipment according to the present invention takes effect of reducing pressure loss of the working medium (particularly, air for burning) of the gas turbine to improve output or efficiency of electric power generation.

Further, for achieving the aforementioned second object, according to the present invention, there is provided gas turbine electric power generation equipment comprising: a humidifier for increasing at least one of a quantity of steam, relative humidity, and absolute humidity of air; a combustor for generating combustion gas by humidified air obtained by the humidifier and fuel; a turbine driven by the combustion gas generated by the combustor; and an electricity generator driven by the turbine to generate electricity. Moreover, the humidifier comprises a partitioning means whose part is opened to partition the interior of the humidifier, the air is introduced into one partitioned by the partitioning means, and compressed water higher in pressure than the air is jetted on the other partitioned by the partitioning means. Preferably, the partitioning means divides the interior of the humidifier in substantially straight direction relative to the introducing direction of the air.

The aforementioned gas turbine electric power generation equipment according to the present invention takes effect of reducing pressure loss of the working medium (particularly, air for burning) of the gas turbine to improve output or efficiency of electric power generation.

Further, for achieving the aforementioned first and second objects, according to the present invention, there is provided gas turbine electric power generation equipment comprising: a compressor for compressing air; a humidifier for adding moisture to the compressed air obtained by the compressor; a combustor for generating combustion gas by humidified air obtained by the humidifier and fuel; a turbine driven by the combustion gas generated by the combustor; an electricity generator driven by the turbine to generate electricity; a regenerator for heating the humidified air supplied to the combustor by the burned exhaust gas discharged from the turbine; a water heater for heating water supplied to the humidifier by the burned exhaust gas discharged from the regenerator; and a water recovery unit for cooling the burned exhaust gas discharged from the water heater to recover moisture in the burned exhaust gas. Moreover, the humidifier comprises a flow path through which the compressed air flows, and a gas and liquid separating portion communicated with the flow path to jet water heated by the water heater to separate it into steam and water. Furthermore, the equipment comprises a heat exchanger for heat-exchanging between water separated by the gas and liquid separating portion and the burned exhaust gas discharged from the water recovery unit.

The aforementioned gas turbine electric power generation equipment according to the present invention takes effect of reducing pressure loss of the burned exhaust gas of the turbine and reducing pressure loss of the working medium (particularly, air for burning) of the gas turbine to improve output or efficiency of electric power generation.

For achieving the aforementioned third object, there is provided a humidifier for adding moisture to air supplied to a combustor according to the present invention comprises a partitioning means whose part is opened to partition the interior of the humidifier, an introducing port for introducing the air into one partitioned by the partitioning means, and a nozzle for jetting water into the other partitioned by the partitioning means.

The aforementioned humidifier according to the present invention takes effect of, while reducing pressure loss of the working medium (particularly, air for burning) of the gas turbine, adding moisture to the working medium for humidification.

For achieving the aforementioned third object, there is privided a humidifier for increasing at least one of a quantity of steam or relative humidity or absolute humidity of a working fluid of a turbine according to the present invention comprises a partitioning means whose part is opened to partition the interior of the humidifier, an introducing port for introducing the working fluid into one partitioned by the partitioning means, and a nozzle for jetting water into the other partitioned by the partitioning means.

The aforementioned humidifier according to the present invention takes effect of, while reducing pressure loss of the working medium (particularly, air for burning) of the gas turbine, adding moisture to the working medium for humidification.

BEST MODE FOR CARRYING OUT THE INVENTION

The embodiments of the present invention will be described hereinafter with reference to the drawings.

Figure 1:
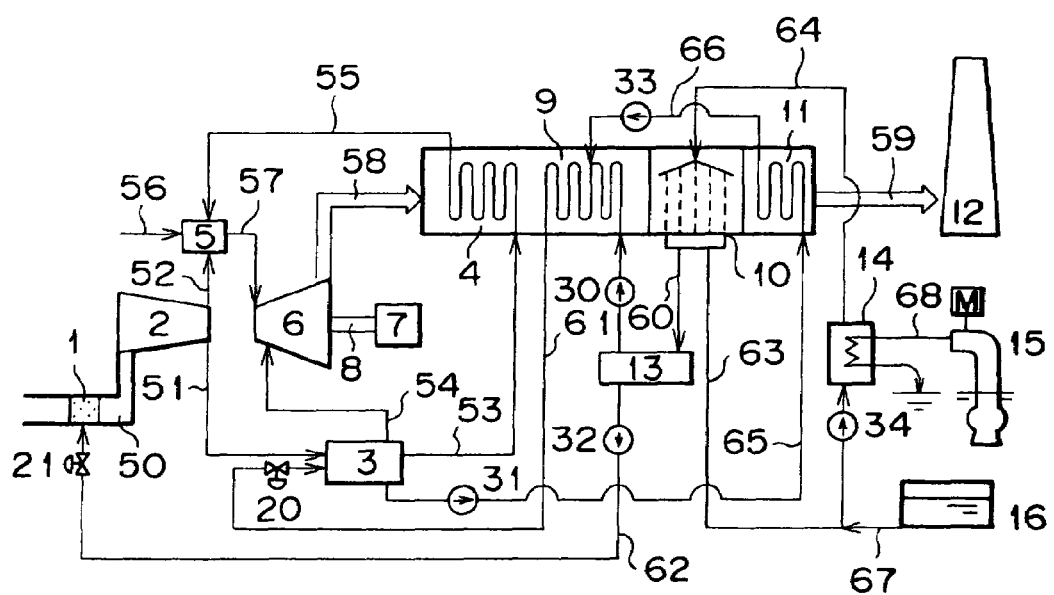
FIG. 1 is a system diagram of gas turbine electric power generation equipment according to a first embodiment of the present invention.

FIG. 1 shows a system diagram of gas turbine electric power generation equipment according to a first embodiment of the present invention. In FIG. 1, reference numeral 1 designates a WAC device for spraying water to air (a); 2 a compressor for compressing the air (a); 3 an air humidifier for humidifying compressed air (b); 4 a regenerator for heating humidified air (c); 5 a combustor for mixing fuel (d) and the humidified air (c) or the compressed air (b) and for burning them to generate combustion gas (e); 6 a turbine driven by the combustion gas (e); 7 a generator for converting power to electricity for generation; 8 a turbine rotor for mechanically connecting the compressor 2, the turbine 6 and the electricity generator 7; 9 a water heater for heating water (k); 10 a water recovery unit for recovering moisture in exhaust gas (f); 11 an exhaust gas reheater for heating the exhaust gas (f); 12 a chimney for releasing the exhaust gas (f); 13 a water processing device for purifying recovery water (g); 14 a cooler for cooling the recovery water (g); 15 a sea water pump for pumping up sea water (j); 16 a replenishing water tank for storing replenishing water (i); 20 and 21 adjusting valves for adjusting flow rate; 30 to 34 pumps for pressurizing liquid; 50 a suction duct through which the air (a) flows; 51 and 52 compressed air lines through which the compressed air (b) flows; 53 to 55 humidified air lines through which the humidified air (c) flows; 56 a fuel line through which the fuel (d) flows, 57 a combustion gas line through which the combustion gas (e) flows; 58 and 59 exhaust ducts through which the exhaust gas (f) flows; 60 recovered water line through which the recovery water (g) flows; 61 and 62 water lines through which the water (k) flows; 63 a circulating water line through which circulating water (l) flows; 65 and 66 surplus water lines through which surplus water (h) flows; 67 replenishing water lines through which the replenishing water (i) flows; and 68 a sea water line through which the sea water (j) flows. Although not shown, reference letter (a) designates air; (b) compressed air; (c) humidified air; (d) fuel (for example, such as natural gas, coal gas, oil or the like), (e) combustion gas (working medium of turbine 6); (f) exhaust gas; (g) recovery water; (h) surplus water; (i) replenishing water; (j) sea water, (k) water, and (l) circulating water.

The WAC device 1 is arranged within the suction duct 50. In the WAC device 1, water (preferably, a part of recovery water (g)) is sprayed on the air (a) sucked into the compressor 2. At this time, in the adjusting valve 21, the quantity of water to be sprayed (for example, about 0.1% vol of the air (a)) is adjusted so that waterdrops in the air (a) may be evaporated within the compressor 2. Thereby, there are obtained an effect in that the air (a) is cooled to reduce power of the compressor 2, and an effect in that since density of the working medium (combustion gas (e)) of the turbine 6 increases due to the fact that the waterdrops in the air (a) are evaporated within the compressor 2, output of electric power generation increases.

The air (a) containing the waterdrops is sucked into the compressor 2 by the WAC device 1. In the compressor 2, the air (a) is compressed to approximately 15 atmospheric pressures. At this time, a temperature of the compressed air (b) obtained will be approximately 370° C.

The compressed air (b) compressed by the compressor 2 is supplied to the air humidifier 3 via the compressed air line 51. In the air humidifier 3, the water (k) is mixed with the compressed air (b) to increase at least one of a quantity of steam or relative humidity or absolute humidity of the compressed air (b). That is, moisture is added to the compressed air (b) to humidify the compressed air (b). The humidity of the humidified air (c) obtained is approximately 19%, for example. In the adjusting vale 20, the quantity of water (k) to be mixed is adjusted in consideration of thermal balance of the whole system of the gas turbine electric power generation equipment. It is to be noted that a part of the compressed air (b) may be supplied to the combustor 5 via the compressed air line 52 without intervention of the moistening unit 3, according to the operating conditions (such as start, stop, load variation, rated load operation, partial addition operation, etc.) of the gas turbine electric power generation equipment.

Remaining water (k) used for humidifying the compressed air (b) in the air humidifier 3 is boosted by the pump 31 as the surplus water (h) (saturated water associated with the pressure of the inside of the air humidifier 3, that is, the pressure of the compressed air (b)), and then is supplied to the exhaust gas reheater 11.

A part or the whole of the humidified air (c) humidified in the air humidifier 3 is supplied to the regenerator 4 via the humidified air line 53. The regenerator 4 is an opposite flow and indirect heat exchanging type heat exchanger. In the regenerator 4, the humidified air (c) and the exhaust gas (f) are heat-exchanged indirectly through a heat transfer pipe or the like whereby the humidified air (c) is heated, for example, to approximately 572° C., and the exhaust gas (f) is cooled, for example, to approximately 361° C. That is, the quantity of heat of the exhaust gas (f) is moved to the humidified air (c) whereby the quantity of heat discharged from the turbine 6 is again supplied upstream of the turbine 6 and is recovered as power for the turbine 6. Thereby, output of the turbine 6 increases. Also in the regenerator 4, the fuel (d) and the exhaust gas (f) are heat-exchanged whereby the quantity of heat of the exhaust gas (f) may be recovered by the fuel (d).

The humidified air (c) heated by the regenerator 4 is supplied to the combustor 5 via the humidified air line 55. On the other hand, the fuel (d) is supplied to the combustor 5 via the fuel line 56. In the combustor 5, the humidified air (c) and the fuel (d) are mixed and burned to generate combustion gas (e) at, for example, approximately 1260° C. In order to prevent a flame from being blown out due to much moisture of air for burning, the construction of the combustor 5 is preferably provided with a diffusion burning portion having a high flame temperature in the center thereof, and a lean burning portion having a relatively low temperature in the circumference thereof.

The combustion gas (e) generated in the combustor 5 is supplied to the turbine 6 via the combustion gas line 57. In the process while the combustion gas (e) expands, a moving blade is rotated, and the turbine rotor 8 to which the moving blade is secured is rotated. The electricity generator 7 connected to one of the turbine rotor 8 is rotated, and in the electricity generator 7, power is converted into electricity to generate electric power. This electric power will be a generator output.

The combustion gas (e) expanded in the turbine 6 will be the exhaust gas (f) (whose temperature is, for example, approximately 602° C., and pressure is, for example, approximately 1.12 atmospheric pressure, which is supplied to the regenerator 4 via the exhaust duct. In the regenerator 4, the exhaust gas (f) and the humidified air (c) are heat-exchanged to cool the exhaust gas (f).

The exhaust gas (f) passed through the regenerator 4 is supplied to the water heater 9. The water heater 9 is an opposite flow and indirect heat exchanging type heat exchanger, similar to the regenerator 4. In the water heater 9, the water (k) and the exhaust gas (f) are heat-exchanged indirectly through a heat transfer pipe or the like whereby the water (k) is heated to, for example, approximately 250° C., and the exhaust gas (f) is cooled to, for example, approximately 93° C. That is, similarly to the regenerator 4, the quantity of heat of the exhaust gas (f) is moved to the water (k) whereby the quantity of heat discharged from the turbine 6 is again supplied upstream the turbine 6 to recover it as power of the turbine 6. Thereby, output of the turbine 6 increases. However, the water heater 9 which uses the water (k) which is liquid to recover heat from the exhaust gas (f) is high in heat transfer efficiency as compared with the regenerator 4 which uses the humidified air (c) which is gas (steam) to recover heat from the exhaust gas (f). Suppose that the same the quantity of heat is recovered, the water heater 9 can reduce a heat transfer area as compared with the regenerator 4, thus making it possible to make its construction compact.

The exhaust gas (f) passed through the water heater 9 is supplied to the water recovery unit 10. In the water recovery unit 10, the circulating water (l) (whose temperature is preferably 20° C. to 40° C., for example, approximately 30° C.) is sprayed or dropped on the exhaust gas (f) from the upper portion of the water recovery unit 10 so that the exhaust gas (f) and the circulating water (l) are brought into direct contact to cool the exhaust gas (f) (heat the circulating water (l) to thereby condense moisture contained in the exhaust gas (f) and recover moisture from the exhaust gas (f). With this, in the water recovery unit 10, a gas component and a liquid component of the exhaust gas (f) are separated so that the gas component is discharged along the flow thereof while the liquid component (moisture) is discharged from the bottom portion. In the water recovery unit 10, the exhaust gas (f) and the circulating water (l) or the sea water (j) are brought into contact indirectly through the heat transfer pipe or the like. Alternatively, however, of the exhaust gas (f) and the circulating water (l) are brought in contact directly, a heat transfer area can be made large, and a heat transfer efficiency is high, which is therefore preferable. The larger the quantity of removing heat of the exhaust gas (f), that is, the lower the temperature of the circulating water (l) and the higher the heat transfer efficiency, the lower the temperature of the exhaust gas (f), and therefore, the quantity of saturated steam of the exhaust gas (f) is small, and moisture that can be recovered increases.

A part of condensed water obtained in the water recovery unit 10 will be the circulating water (l), which is boosted by the pump 34 via the circulating water line 63, after which it is supplied to the cooler 14. The cooler 14 is an opposite flow and indirect heat exchanging type heat exchanger. In the cooler 14, the circulating water (l) and the sea water (j) are heat-exchanged indirectly through the heat transfer pipe or the like to thereby cool the circulating water (l) and heat the sea water (j). The circulating water (l) cooled by the water recovery unit 10 is again supplied to the water recovery unit 10 and is sprayed or dropped from the upper portion of the water recovery unit 10. The sea water (j) is pumped up by the sea water pump 15, and is supplied to the cooler 14 via the sea water line 68. Since the quantity of heat moved to the sea water (j) is discharged outside the system of the gas turbine electric power generation equipment, it will be loss of the gas turbine electric power generation equipment. Therefore, the smaller the quantity of heating the sea water (j), that is, the quantity of removing heat of the circulating water (l), the higher the thermal efficiency of the gas turbine electric power generation equipment. As a medium for cooling the circulating water (l), any medium will suffice which is lower in temperature than the circulating water (l) other than the sea water (j).

The replenishing water (i) stored in the replenishing water tank 16 is added to the circulating water (l) via the replenishing water line 67. Thereby, it is possible to replenish moisture which is short in the system of the gas turbine electric power generation equipment, that is, moisture contained in the exhaust gas (f) and discharged outside the system. In the gas turbine electric power generation equipment according to the present embodiment, moisture added upstream the turbine 6 is recovered downstream the turbine 6, and the moisture recovered is used as moisture to be added upstream the turbine 6, whereby the moisture is circulated within the system of the gas turbine electric power generation equipment. Therefore, there is very little water which is short in the system of the gas turbine electric power generation equipment. However, all the moisture added upstream the turbine 6 cannot be recovered downstream the turbine 6. This is due to the fact that the quantity of moisture contained in the exhaust gas (f) discharged from the water recovery unit 10 (corresponding to the quantity of saturated steam of the exhaust gas (f)) is large as compared with the quantity of moisture contained in the air (a). Therefore, the replenishing water (i) is necessary.

A part of the condensed water obtained in the water recovery unit 10 will be recovery water (g), which is supplied to the water processing device 13 via the recovery water line 60. In the water processing device 13, the recovery water (g) is denitrified and desulfurized. A part or the whole of the recovery water (g) purified in the water processing device 13 is boosted to, for example, approximately 50 atmospheric pressures by the pump 30, after which it is supplied to the water heater 9 as the water (k). When pressure of the water (k) is risen, saturated temperature of the water (k) also rises to thereby enable to prevent the water (k) from boiling in the water heater 9. Thus, the heat recovery is enabled without subjecting to limitation of a pinch point of a heat exchanger that poses a problem in the heat recovery making use of a waste heat recovery boiler of a combined cycle generation plant. On the other hand, a part of the recovery water (g) purified in the water processing device 13 is boosted by the pump 32, after which it is supplied as the water (k) to the WAC device 1.

On the other hand the exhaust gas (f) from which moisture is removed to some extent in the water recovery unit 10 is supplied to the exhaust gas reheater 11. The exhaust gas reheater 11 is an opposite flow and indirect heat exchanging type heat exchanger. The exhaust gas (f) and the surplus water (h) are heat-exchanged in the exhaust gas reheater 11 whereby the exhaust gas (f) is heated to, for example, approximately 140° C., and the surplus water (h) is cooled to, for example, approximately 77° C. In the exhaust gas reheater 11, the exhaust gas (f) and the surplus water (h) may be brought into direct contact. However, when the exhaust gas (f) and the surplus water (h) are brought into direct contact, moisture is again to be added to the exhaust gas (f)

from which moisture is removed to some extent. It is therefore preferable that the exhaust gas (f) and the surplus water (h) are brought into indirect contact.

The exhaust gas (f) heated by the exhaust gas reheater 11 is supplied to the chimney 12 through the exhaust gas duct 59 and is released into the atmosphere. On the other hand, the surplus water (h) cooled in the exhaust gas reheater 11 is boosted by the pump 33 to, for example, approximately 50 atmospheric pressures, after which it is supplied to the water heater 9 to merge with the water (k).

According to the first embodiment, as the heating medium for heating the exhaust gas (f) in the exhaust gas reheater 11, the surplus water (h) which is liquid is used whereby the heat transfer efficiency is high and the heat transfer area is small as compared with that uses gas as the heating medium, thus making it possible to make the exhaust gas reheater 11 compact. Thereby, pressure loss of the exhaust gas (f) in the exhaust gas reheater 11 can be reduced. Since the pressure of the exhaust gas (f) in the chimney 12 is determined, when the pressure loss of the exhaust gas (f) in the exhaust gas reheater 11 is reduced, pressure of the exhaust gas (f) at the outlet of the turbine 6 can be made low. Thereby, pressure difference between the inlet of the turbine 6 and the outlet of the turbine 6, of the working medium (the combustion gas (e)) of the turbine 6 is large, whereby power obtained in the turbine 6, that is, rotating force of the turbine rotor 8 is great, and the output of electric power generation can be increased.

Further, according to the present embodiment, as the heating medium for heating the exhaust gas (f) in the exhaust gas reheater 11, the surplus water (h) is used, whereby the heat balance of the whole system of the gas turbine electric power generation equipment is improved so that temperature in the air humidifier 3 rises. Thereby, it is not necessary to cool the compressed air (b) in order to lower the temperature in the air humidifier 3, in consideration of the heat balance in the whole system, and a posteriorly disposed cooler or the like arranged on the compressed air line 51 in order to cool the compressed air (b) is unnecessary. With this, the pressure loss of the compressed air (b) can be reduced, the pressure loss of the working medium (combustion gas (e)) of the turbine 6 can be reduced, and the pressure of the working medium (combustion gas (e)) of the turbine 6 at the inlet of the turbine 6 becomes high, thus enabling an increase in output of electric power generation. Further, the volume of a flow path from the compressor 2 to the combustor 5 is small by that portion not provided with the posteriorly disposed cooler or the like, thus improving respondency of system and enabling lessening of deterioration of aerodynamical characteristic of the compressor 2. Further, the heat transfer loss of the compressed air (b) occurring in the passage of the posteriorly disposed cooler or the like is eliminated.

Moreover, according to the first embodiment, since the temperature in the air humidifier 3 rises, the temperature of the humidified air (c) also rises, the quantity of heat exchange between the humidified air (c) and the exhaust gas (f) in the regenerator 4 is small, whereby the regenerator 4 inevitably becomes compact. Thereby, the pressure loss of the exhaust gas (f) in the regenerator 4 is small, and the pressure of the exhaust gas (f) at the outlet of the turbine 6 can be made low. Thereby, since the pressure difference between the inlet of the turbine 6 and the outlet of the turbine 6 of the working medium (combustion gas (e)) of the turbine is large, the power obtained in the turbine 6, that is, the rotating force of the turbine rotor 8 is great to enable an increase of the output of electric power generation.

The detailed construction of the air humidifier 3 will now be described.

Figure 2:
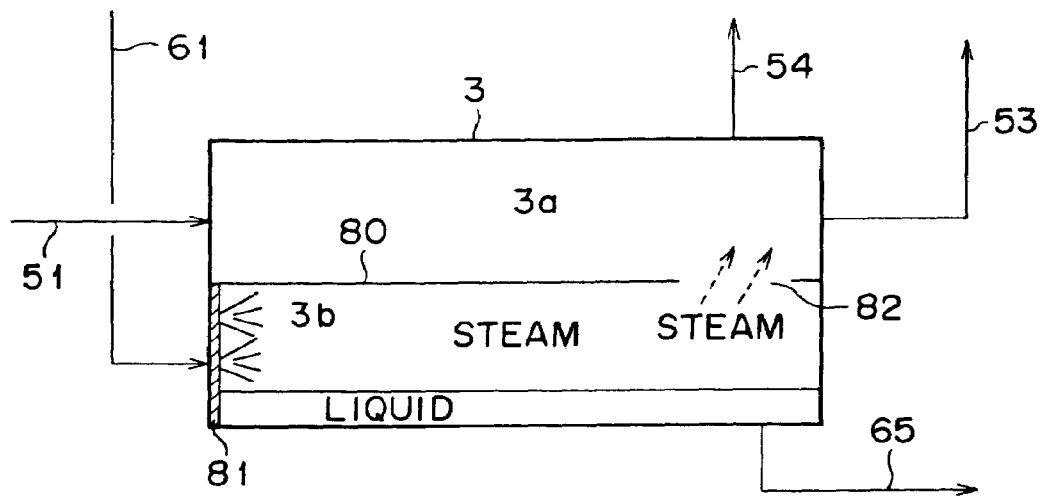
FIG. 2 is a structural view of an air humidifier of the gas turbine electric power generation equipment according to the first embodiment of the present invention.

FIG. 2 shows a structural view of an air humidifier of the gas turbine electric power generation equipment according to the first embodiment of the present invention. In FIG. 2, reference numeral 3a designates a merging portion (a flow path through which compressed air (b) flows) where water (k) (compressed water of, for example, approximately 50 atmospheric pressures) which is expanded and compressed air (b) merge; 3b an expanding portion (a vaporizing portion in which water (k) is vaporized) in which water (k) is expanded; 80 a partitioning plate for partitioning the interior of the air humidifier 3 into the merging portion 3a and the expanding portion 3b; 81 a spray nozzle for spraying water (b); and 82 an opening (a communication portion for communication between the merging portion 3a and the expanding portion 3b) provided in the partitioning plate 80.

The interior of the air humidifier 3 is divided into upper and lower portions by the partitioning plate 80. An upper region partitioned by the partitioning plate 80 is the merging portion 3a, and a lower region partitioned by the partitioning plate 80 is the expanding portion 3b. A spray nozzle 81 in communication with the water line 61 is arranged in the expanding portion 3b. The partitioning plate 80 has an opening 82 downstream along the flow of the compressed air (b) and the expanded water (k).

The compressed air (b) flows into the merging portion 3a. On the other hand the water (k) is sprayed on the expanding portion 3b from the spray nozzle 81 and then expanded, a part of which is vaporized into steam (m) (saturated steam having pressure of the expanding portion 3b, that is, pressure corresponding to that of the compressed air (b), the remainder being surplus water (h) (saturated water having pressure of the expanding portion 3b, that is, pressure corresponding to that of the compressed air (b)). Then, the steam (m) flows into the merging portion 3a from the opening 82 to merge with the compressed air (b), which is the humidified air (c). On the other hand the surplus water (h) is discharged outside the air humidifier 3 from the bottom of the expanding portion 3b.

If the pressure of the water (k) is higher than that of the compressed air (b), the water (k) expands at the expanding portion 3b, but when pressure difference between the pressure of the water (k) and the pressure of the compressed air (b) is small, the quantity of vaporizing the water (k) is so small that the compressed air (b) cannot be humidified sufficiently. Preferably, therefore, the pressure difference between the pressure of the water (k) and the pressure of the compressed air (b) is, for example, 20 atmospheric pressures or more. That is, suppose that the pressure of the compressed air (b) is 15 atmospheric pressures, the pressure of the water (k) is preferably 35 atmospheric pressures or more. However, the upper limit of the pressure of the water (k) is determined depending on the boosting ability of the pump 30 for boosting water (k) and the pressure resistance of the water line 61. For example, suppose that the pressure of the compressed air (b) is 15 atmospheric pressures and its temperature is 366° C., and that the pressure of the water (k) is 50 atmospheric pressures and its temperature is 250° C., then the water (k) expands to approximately 15 atmospheric pressures in the expanding portion 3b, whereby approximately 10% of the water (k) at the rate of weight is vaporized. That is, approximately 10% of the water (k) will be the steam (m), and approximately 90% of the remaining will be the surplus water (h). When the water (k) under high pressure expands, a temperature is changed to a temperature of saturated steam corresponding to pressure after the expansion. However, since surplus thermal energy is released as latent heat of vaporization, steam is generated. Therefore, in the case where a larger the quantity of steam (m) is desired to be obtained, it can be achieved by making pressure difference between the compressed air (b) and the water (k) large, for example, such as 50, 100, 150 and 200 atmospheric pressures. Further, the quantity of steam, relative humidity and absolute humidity of the humidified air (c) depend on the generation the quantity of the steam (m), that is, the flow rate of the water (k) and pressure. Therefore, by controlling the flow rate of the water (k) and pressure, it is possible to control the quantity of steam, relative humidity and absolute humidity of the humidified air (c).

According to the air humidifier shown above, since the steam (m) having the same pressure as the compressed air (b) does and the compressed air (b) cause to be merged (mixed) along the flow of the compressed air (b), there occurs less disturbance in the flow of the compressed air (b), as compared with the well-known humidifying tower in which compressed air and waterdrops are placed in contact in opposite flow and directly, and pressure loss of the compressed air (b) (humidified air (c)) can be reduced. Further, the construction of the air humidifier is simple, as compared with the conventional humidifying tower in which compressed air and waterdrops are placed in contact in opposite flow and directly, and the air humidifier can be made compact. That is, in the conventional humidifying tower, since waterdrops are changed into steam by making use of heat the quantity of the compressed air, it is necessary to promote contact between the compressed air and the waterdrops in order to obtain necessary the quantity of steam, because of which the compressed air and the waterdrops had to be placed in contact in opposite flow through a porous medium. On the other hand, in the above-described air humidifier, saturated steam which is steam containing therein a largest the quantity of moisture can be obtained making use of not only the heat the quantity of compressed air but also the heat the quantity of water itself resulting from expansion, because of which necessary the quantity of steam can be secured not in opposite flow or without a porous medium.

Further, according to the gas turbine electric power generation equipment in the present embodiment provided with the air humidifier as described above, since there is less pressure loss of the compressed air (b) (humidified air (c)) in the air humidifier 3, the pressure loss of a working medium (combustion gas (e)) of the turbine 6 can be reduced, and since the pressure of the working medium (combustion gas (e)) of the turbine 6 at the inlet of the turbine is high, output of electric power generation can be increased.

Another construction of the air humidifier 3 will be described hereinafter.

Figure 3:
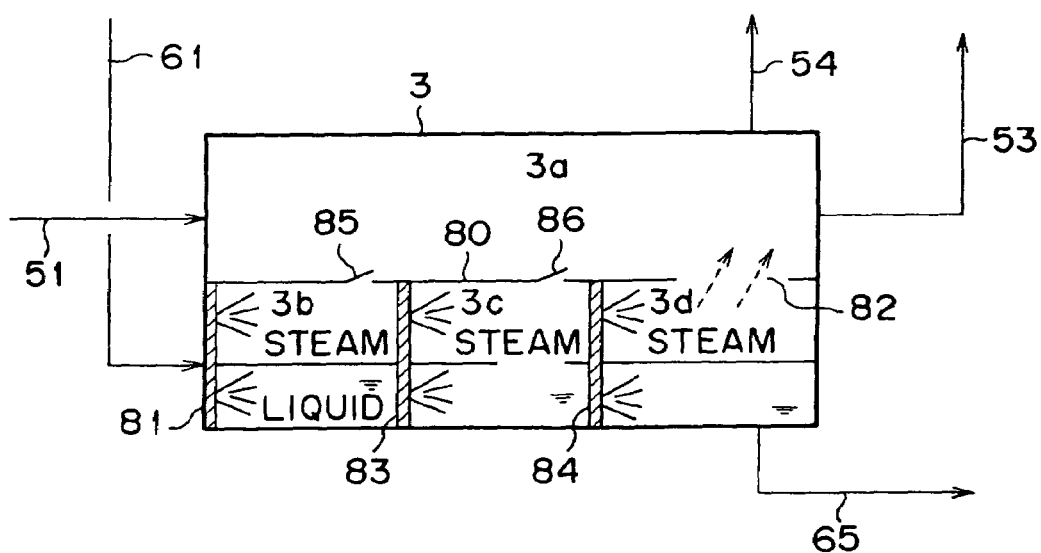
FIG. 3 is a structural view of another air humidifier of the gas turbine electric power generation equipment according to the first embodiment of the present invention.

FIG. 3 shows a structural view of another air humidifier of the gas turbine electric power generation equipment according to the first embodiment of the present invention. In FIG. 3, reference numeral 3c and 3d designate expanding portions in which water (k) expands; 83 and 84 spray nozzles for spraying water (k); and 85 and 86 openings provided in a partitioning plate 80.

A difference from the air humidifier shown in FIG. 2 is that there are a plurality of expanding portions (3b, 3c and 3d), and water (k) having different pressures are sprayed. Water (k) supplied from the water line 61 is sprayed from the spray nozzle 81, and is expanded in the expanding portion 3b to generate steam (m). The expanding portion 3b is communicated with the expanding portion 3c, and the steam (m) generated in the expanding portion 3b is sprayed from the spray nozzle 83. The steam (m) is further expanded in the expanding portion 3c to generate steam (n). The expanding portion 3c is communicated with the expanding portion 3d, and the steam (n) generated in the expanding portion 3c is sprayed from the spray nozzle 84. The steam (m) is further expanded in the expanding portion 3d to generate steam (o). That is, there occurs a relation of (pressure of steam (m))> (pressure of steam (n)) (pressure of steam (o))=(pressure of compressed air (b)). The pressure of the steam (o) corresponds to the compressed air (b) and the steam (o) flows into the merging portion 3a from the opening 80 to merge with the compressed air (b).

According to the present air humidifier, expanding range (pressure reducing width) in the expanding portion of water (k) is so small that the expansion of the water (k) causes to occur gently whereby sound or vibration generated when expanded can be made small. This is particularly effective when pressure difference between the compressed air (b) and the water (k) is large such as 50 atmospheric pressures or more.

Figure 4:
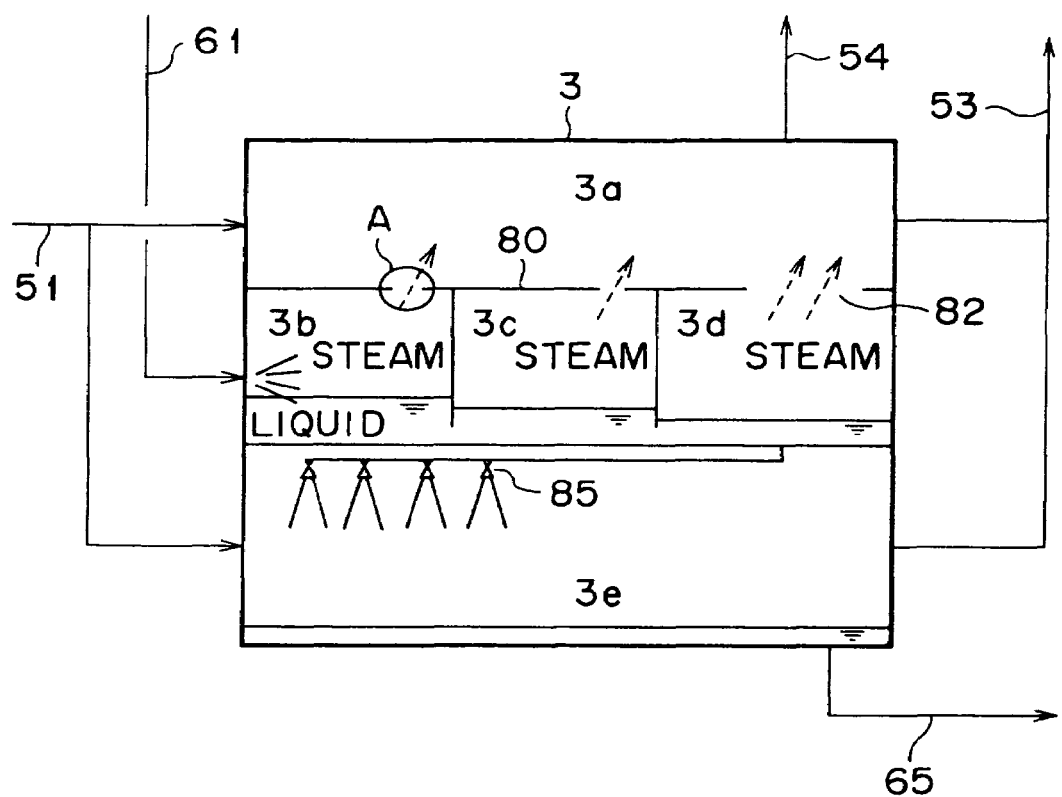
FIG. 4 is a structural view of still another air humidifier of the gas turbine electric power generation equipment according to the first embodiment of the present invention.

Further, FIG. 4 shows a structural view of still another air humidifier of the gas turbine electric power generation equipment according to the first embodiment of the present invention. In FIG. 4, reference numeral 3e designates a mixing portion for mixing surplus water (h) with compressed air (b), and 85 a spray nozzle for spraying the surplus water (h).

A difference from the air humidifier shown in FIG. 3 is that a region to which the compressed air (b) is supplied is divided into a plurality of parallel merging portion 3a and a mixing portion 3e. In the merging portion 3a, the compressed air (b) and steam (m) are merged, and in the mixing portion 3e, the surplus water (h) from the expanding portion 3d or the like is sprayed so that the compressed air (b) and the surplus water (h) are mixed. That is, in the mixing portion 3e, the compressed air (b) and the surplus water (h) are brought into direct contact.

According to the present air humidifier, since the surplus water (h) is vaporized in the mixing portion 3e, heat of gasification is carried away by the vaporization, because of which a temperature of the surplus water (h) discharged into the surplus water line 65 can be lowered.

Figure 5:
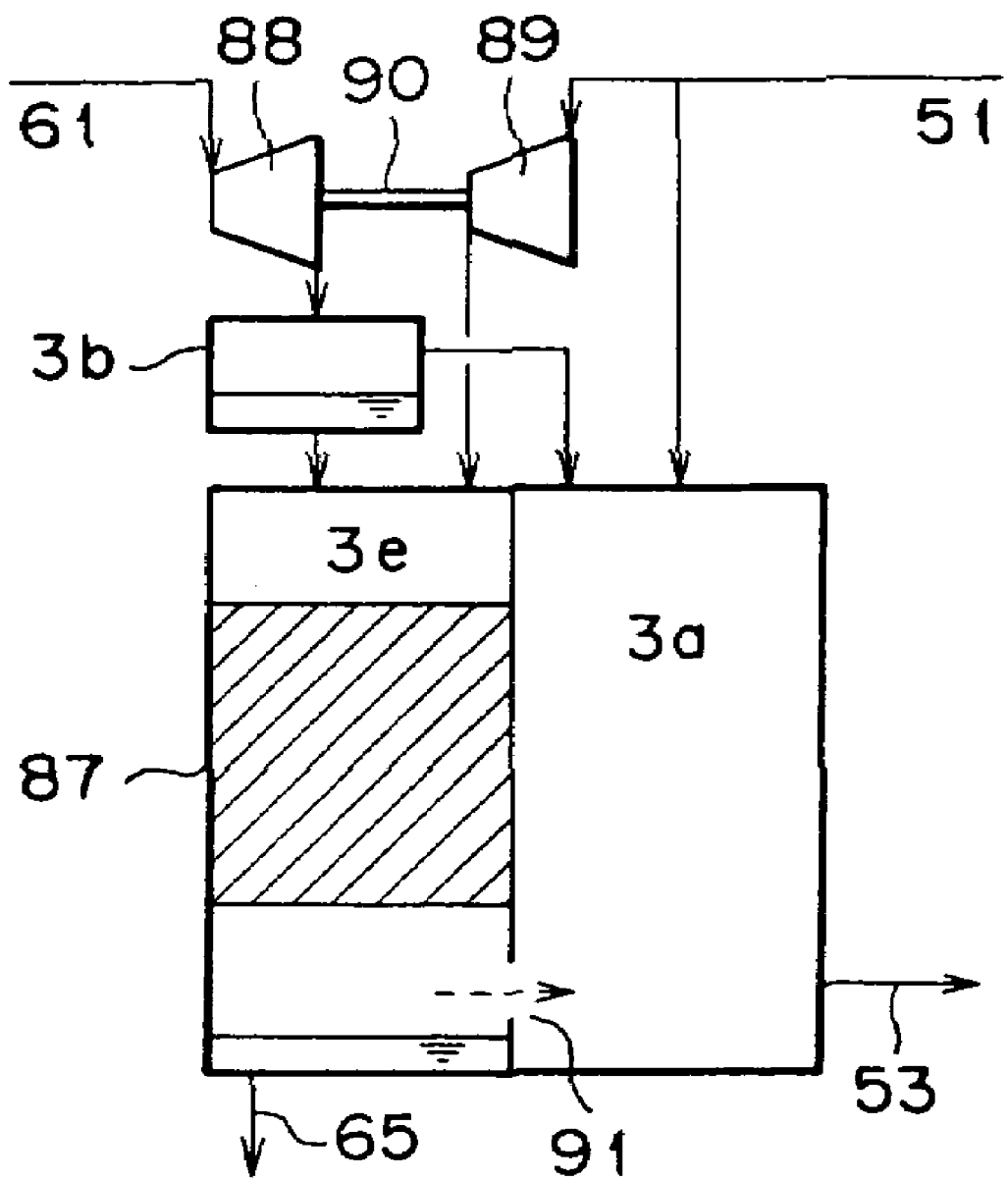
FIG. 5 is a structural view of further another air humidifier of the gas turbine electric power generation equipment according to the first embodiment of the present invention.

Further, FIG. 5 shows a structural view of another air humidifier of the gas turbine electric power generation equipment according to the first embodiment of the present invention. In FIG. 5, reference numeral 87 designates a porous medium; 88 a turbine; 89 a compressor; 90 a turbine rotor; and 91 a communicating portion in which a merging portion 3a and a mixing portion 3e are communicated.

A difference from the air humidifier shown in FIG. 4 is that the porous medium 87 is arranged in the mixing portion 3e to increase the amount of contact between the compressed air (b) and the surplus water (h). When the compressed air (b) and the surplus water (h) are brought into contact using the porous medium 87, the amount of contact between the compressed air (b) and the surplus water (h) increases while the pressure loss of the compressed air (b) (humidified air (c)) increases. So, by making use of pressure energy of the water (k), the compressed air (b) is compressed to correct the pressure lowering of the compressed air (b).

That is, the water (k) is supplied to the turbine 88. On the other hand the compressed air (b) is supplied to the compressor 89. In the turbine 88, by making use of the expansion of the water (k), the moving blade of the turbine is rotated, and the turbine rotor 90 is rotated. By making use of the rotation of the turbine rotor 90, the compressor 89 connected to the other of the turbine rotor 90 is rotated. Thereby, the compressed air (b) is further compressed. The compressed air (b) compressed by the compressor 89 is supplied to the mixing portion 3e. The water (k) expanded in the turbine 88 is supplied to the expanding portion 3b for further expansion to separate it into steam (m) and surplus water (h). The steam (m) is then supplied to the merging portion 3a and is merged with the compressed air (b). On the other hand the surplus water (h) is supplied to the mixing portion 3e to mix with the compressed air (b) compressed by the compressor 89 through the porous medium 87. Thereby, it is possible to prevent the pressure loss of the compressed air (b) in the mixing portion 3e having the porous medium 87.

Another construction of the gas turbine electric power generation equipment according to the present invention will be described hereinafter.

Figure 6:
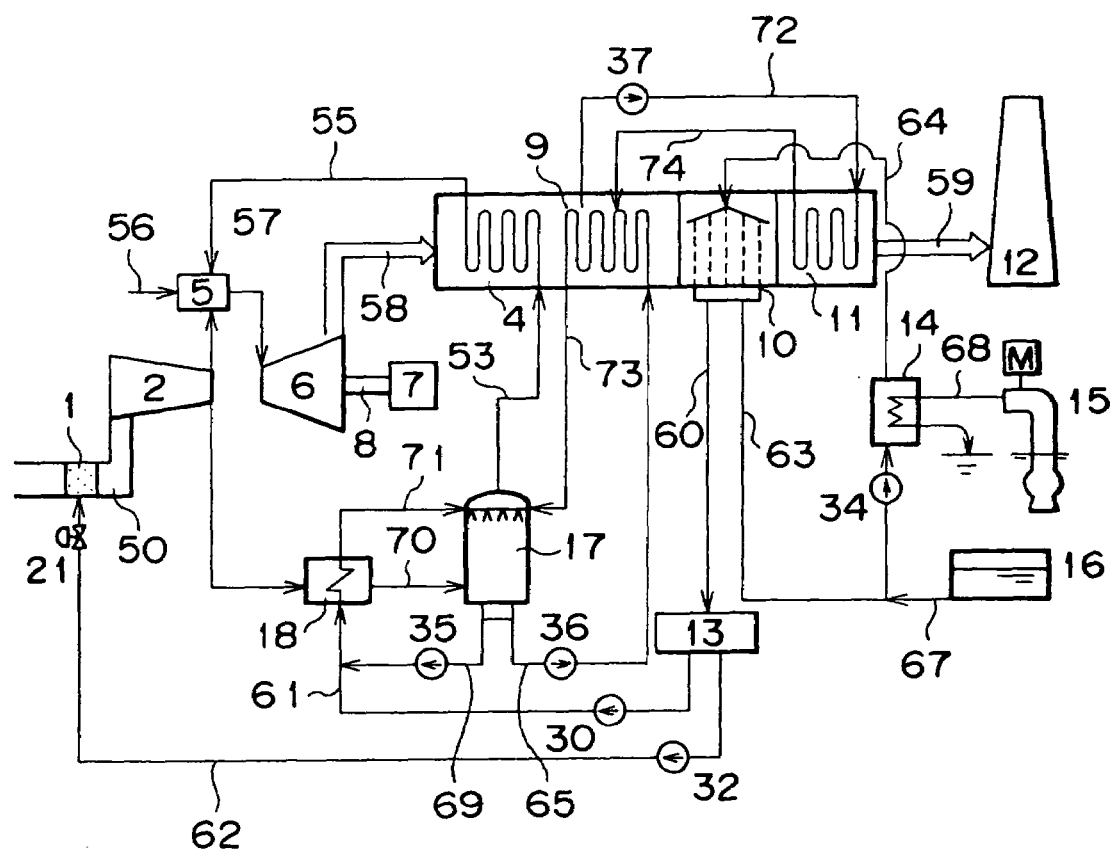
FIG. 6 is a system diagram of gas turbine electric power generation equipment according to a second embodiment of the present invention.

FIG. 6 is a system diagram of gas turbine electric power generation equipment according to a second embodiment of the present invention. In FIG. 6, reference numeral 17 designates an air humidifier for humidifying compressed air (b); 18 a posteriorly disposed cooler for cooling the compressed air (b); 35 to 37 pumps for boosting liquid; 69 a surplus water line through which surplus water (h) flows; 70 a compressed air line through which the compressed air (b) cooled in the posteriorly disposed cooler 18 flows; and 71 to 74 water lines through which water (k) flows.

A difference from the gas turbine electric power generation equipment shown in FIG. 1 is that as the air humidifier 17, there is used a well-known humidifying tower in which compressed air and waterdrops are brought into contact in opposite flow and directly, and that in the exhaust gas reheater 11, exhaust gas (f) is heated using a part of the water (k).

That is, the compressed air (b) is supplied to the posteriorly disposed cooler 18 through the compressed air line 51. The posteriorly disposed cooler 18 is a heat exchanger of an opposite flow and indirect heat exchanging type. In the posteriorly disposed cooler 18, the compressed air (b) and the water (k) having passed through the water line 61 are subjected to indirect heat exchanging through a heat transfer pipe or the like whereby the compressed air (b) is cooled to, for example, approximately 100° C., and the water (k) is heated to, for example, approximately 80° C. More preferably, the surplus water (h) having passed through the surplus water line 69 is merged with the water (k) having passed through the water line 61 to supply it to the posteriorly disposed cooler 18.

The compressed air (b) cooled by the posteriorly disposed cooler 18 is supplied to the air humidifier 17 through the compressed air line 70. On the other hand the water (k) heated in the posteriorly disposed cooler 18 is also supplied to the air humidifier 17 through the water line 71. The water (k) having passed through the water line 73 is also supplied to the air humidifier 17. In the air humidifier 17, the water (k) having passed through the water line 71 and the water (k) having passed through the water line 73 are dropped while the compressed air (b) having passed through the compressed air line 72 is blown up upwardly from the bottom portion of the air humidifier 17 whereby the water (k) having passed through the water line 71, the water (k) having passed through the water line 73, and the compressed air (b) having passed through the compressed air line 72 are brought into contact in an opposite flow and directly to humidify the compressed air (b). That is, the air humidifier 17 is to increase moisture in air during the time till the compressed air (b) entered from the lower part thereof flows out from the upper part thereof. Within the air humidifier 17, the water (k) flows down from the upper portion toward the bottom portion and comes in contact with air flowing upward directly in an opposite flow state. The flowing-down water (k) is that under the principle in which water loses latent heat of vaporization when vaporized to lower its own temperature, a temperature of the water (k) flowing down from the upper portion lowers as it moves down, is lower, at the lower end of the air humidifier 17 (i.e., in a state of the surplus water (h)), than a temperature of the compressed air (b) being flown into the air humidifier 17. The surplus water (h) then recovers heat from the exhaust gas (f) and is again supplied upward of the air humidifier 17. In the process of recovering heat, it is preferable that to enable recovery to a region of temperature as low as possible, a temperature of the surplus water (h) used for heat recovery is low. It is necessary for obtaining surplus water (h) of low temperature to lower a temperature of the compressed air (b) flowing into the air humidifier 17, because of which the posteriorly disposed cooler 18 is provided.

The compressed air (b) humidified in the air humidifier 17 is supplied, as humidified air (c), to the regenerator 4 via the humidified air 53. A part of the surplus water (h) of the air humidifier 17 is discharged from the bottom portion of the air humidifier 17 and is boosted in the pump 35 via the surplus water line 69, after which it is mered with the water (k) having passed through the water line 61 and is supplied to the posteriorly disposed cooler 18.

A part or the whole of the surplus water (h) of the air humidifier 17 is discharged from the bottom portion of the air humidifier 17, and is boosted by the pump 36 via the surplus water line 65, after which it is supplied, as the water (k), to the water heater 9. In the water heater 9, the water (k) and the exhaust gas (f) are heat exchanged to thereby heat the water (k).

A part of the water (k) heated by the water heater 9 is boosted by the pump 37 via the water line 72, and thereafter supplied to the exhaust gas reheater 11. By the heat exchange between the exhaust gas (f) and the water (k), the exhaust gas (f) is heated to, for example, approximately 140° C., and the water (k) is cooled to, for example, approximately 77° C. The water (k) cooled by the exhaust gas reheater 11 is again returned to the water heater 9 via the water line 74. Preferably, a position within the water heater 9 to which is returned the water (k) cooled by the exhaust gas reheater 11 (a connecting point between the water heater 9 and the water line 74) is upstream along the flow of the water (k) (i.e., on the low temperature side of the water (k)) from a position within the water heater 9 from which is discharged a part of the water (k) heated by the water heater 9 (i.e., a connecting point between the water heater 9 and the water line 72).

According to the second embodiment, liquid which is a part of the water (k) heated by the water heater 9 is used, as a heating medium for heating exhaust gas (f) in the exhaust gas reheater 11, whereby the heat transfer efficiency is high and the heat transfer area is small, as compared with the case where gas is used as a heating medium, thus making it possible to make the exhaust gas reheater 11 compact. Thereby, the pressure loss of the exhaust gas (f) in the exhaust gas reheater 11 can be reduced. Since pressure of the exhaust gas (f) in the chimney 12 is determined, when the pressure loss of the exhaust gas (f) in the exhaust gas reheater 11 is reduced, the pressure of the exhaust gas (f) at the outlet of the turbine 6 can be made low. Since pressure difference between the inlet of the turbine 6 and the outlet of the turbine of a working medium (combustion gas (e)) of the turbine 6 is large, power obtained in the turbine, that is, rotating force of the turbine rotor 8 is large, thus enabling an increase of output of electric power generation.

That is, even if a well-known humidifying tower for bringing compressed air and waterdrops into contact in an opposite flow and directly is used, as the air humidifier 17, the exhaust gas (f) is heated in the exhaust gas reheater 11 making use of a part of the water (k) to thereby reduce the pressure loss of the exhaust gas (f), thus enabling an increase of output of electric power generation.

It is noted that even if the air humidifier shown in FIGS. 2 to 5 is used, as the air humidifier 17 in the second embodiment, similar effects can be obtained.

Figure 7:
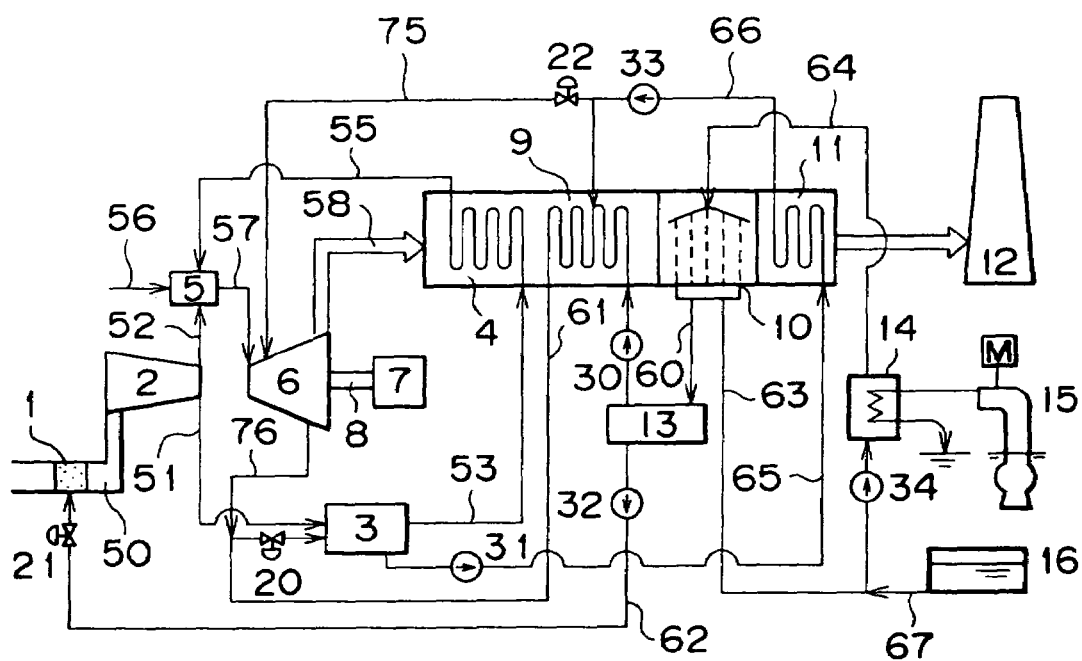
FIG. 7 is a system diagram of gas turbine electric power generation equipment according to a third embodiment of the present invention.

FIG. 7 is a system diagram of gas turbine electric power generation equipment according to a third embodiment of the present invention. In FIG. 7, reference numeral 22 designates an adjusting valve for adjusting flow rate, and 75 and 76 blade cooling water lines through which blade cooling water (p) flows.

A difference from the gas turbine electric power generation equipment shown in FIG. 1 is that a part of surplus water (h) cooled in the exhaust gas reheater 11 is used to cool the turbine 6.

That is, a part of surplus water (h) cooled in the exhaust gas reheater 11 is supplied, as the blade cooling water (p), to the turbine 6 via the blade cooling water line 75. In the turbine 6, the blade cooling water (p) is circulated in a turbine static blade or the like to cool the turbine static blade or the like. The turbine static blade or the like is cooled whereby the blade cooling water (p) heated in the turbine 6 is merged with the water (k) having passed through the water line 61 via the blade cooling water line 76 and is supplied to the air humidifier 3. That is, the compressed air (b) is humidified using the blade cooling water (p) after having cooled the turbine static blade or the like. The adjusting valve 22 may be controlled, on the basis of at least one of output of electric power generation or temperature of such as a turbine static blade or temperature of the combustion gas (e) or the operating condition of the gas turbine electric power generation equipment, to adjust the flow rate of the blade cooling water (p).

According to the third embodiment, the turbine static blade or the like can be cooled efficiently in addition to the effect of the first embodiment previously mentioned. That is, since liquid which is the blade cooling water (p) is used as a cooling medium of the turbine static blade or the like, the heat transfer efficiency is better than cooling of the turbine static blade or the like by the humidified air (c), and than well-known steam cooling or well-known air cooling.

Further, since cooling media such as the humidified air (c) for cooling of the turbine static blade or the like, well-known steam cooling and well-known air cooling normally comprise air or steam contributed to electric power generation, there posed a problem in that when the air or steam is used for cooling the turbine static blade or the like, generation efficiency lowers. However, according to the third embodiment, the blade cooling water (p) not contributed to electric power generation is used as the cooling medium for the turbine static blade or the like, to thereby enable prevention of the lowering of electric power generation efficiency resulting from cooling of the turbine static blade.

INDUSTRIAL APPLICABILITY

The gas turbine electric power generation equipment and air humidifier according to the present invention are utilized for the generation field for producing electric power.

What is claimed is:

1. Gas turbine electric power generation equipment comprising:
    a compressor for compressing air;
    a spraying device for spraying water to the air to be supplied to said compressor;
    a humidifier for adding moisture to the compressed air;
    a combustor for generating combustion gas by humidified air obtained by said humidifier and fuel;
    a turbine driven by the combustion gas generated by said combustor;
    an electricity generator driven by said turbine to generate electricity;
    a water recovery unit to recover moisture in the burned exhaust gas of said turbine; and
    a heat exchanger for heat-exchanging between surplus water discharged from said humidifier and the burned exhaust gas discharged from said water recovery unit.

2. The gas turbine electric power generation equipment of claim 1,
    wherein said heat exchanger is an exhaust gas reheater for heating the burned exhaust gas discharged from said water recovery unit by surplus water left in that used for increasing the quantity of steam or relative humidity or absolute humidity of air by said humidifier.

3. The gas turbine electric power generation equipment of claim 1,
    said equipment further having a regenerator for heating said humidified air supplied to said combustor by the burned exhaust gas discharged from said turbine; and
    a water heater for heating water supplied to said humidifier by the burned exhaust gas discharged from said regenerator;
    wherein said water heater heats the surplus water discharged from said heat exchanger to supply it to said humidifier.

4. The gas turbine electric power generation equipment of claim 1,
    further comprising a water line between said water recovery unit and said spraying device, through which the surplus water discharged from said water recovery unit is supplied to an inlet of the compressor.

5. The gas turbine electric power generation equipment of claim 1,
    further comprising a cooling water line between said humidifier and said turbine, through which a part of water supplied to said humidifier is used to cool said turbine.

* * * * *